April 19, 1960
H. L. NAIMER
2,933,581
SWITCH-MOUNTING ASSEMBLY
Filed June 25, 1958
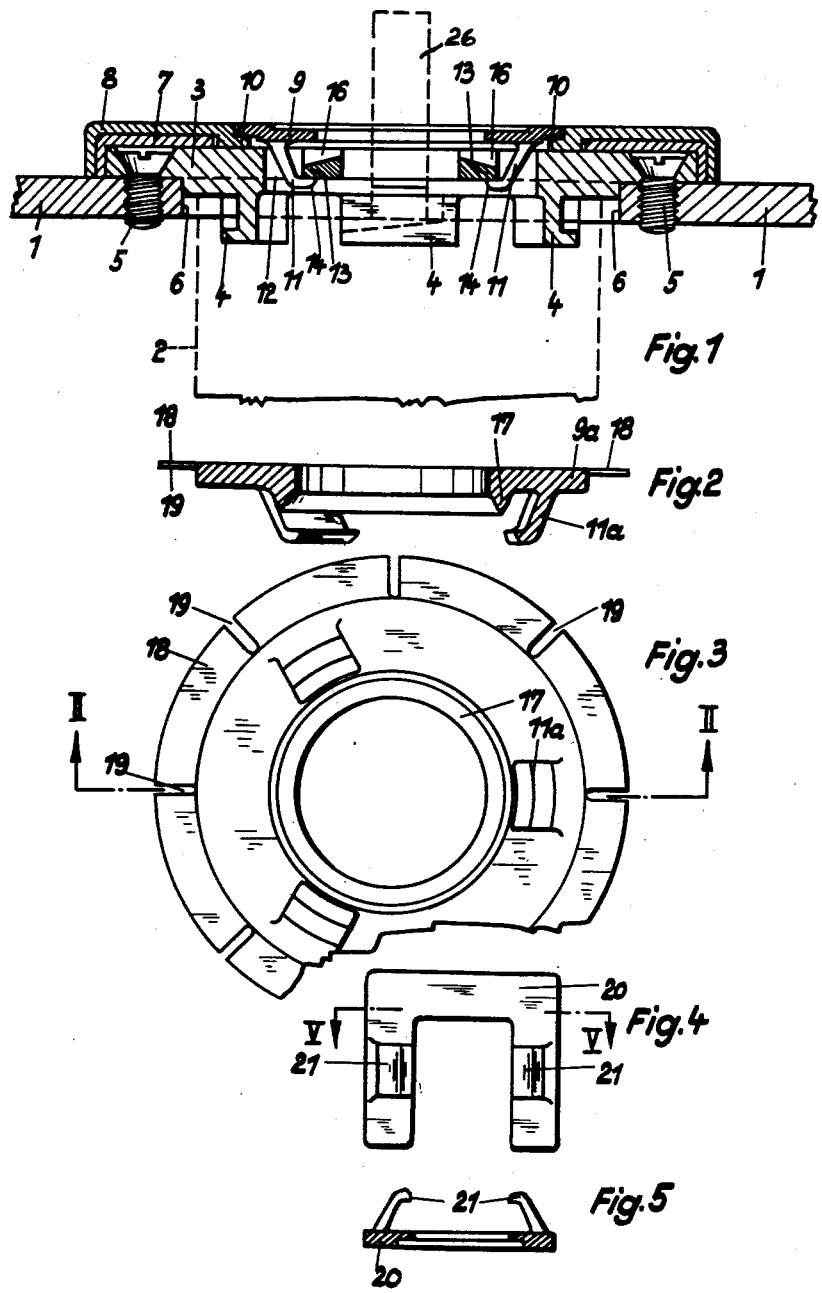
INVENTOR:
Hubert L. Naimer
BY Karl F. Ross
Agent

United States Patent Office 2,933,581
Patented Apr. 19, 1960

2,933,581

SWITCH-MOUNTING ASSEMBLY

Hubert L. Naimer, Vienna, Austria

Application June 25, 1958, Serial No. 744,480

Claims priority, application Austria July 3, 1957

5 Claims. (Cl. 200—167)

Electrical switches of small and medium size, particularly those which are operable by a rotatable knob, are frequently mounted on a control panel in the wall of a machine housing, a control box or the like in such a manner that the stub shaft which carries the knob protrudes outwardly. The switches are affixed to such walls with the aid of front plates which carry the switch and are screwed to the wall of the housing. The front plate is covered toward the outside by an indicator plate, which indicates the operating conditions associated with the several positions of the switch, such as "On," "Off," "Zero," "Star" or "Delta," and which covers the means for fixing the switch so as to provide for a pleasing appearance. In many cases an additional cover of transparent material is provided over this sign.

As the requirement to minimize the assembling work needed at the point of installation of electrical equipment such as switches gains in importance in view of the increasingly urgent requirement for a reduction of manual work, the fact that the assembling operations involved in the mounting of the indicator plate and of the cover represent a considerable amount of work, considered together. The invention is concerned with these difficulties and proposes means for fixing indicator plates and, if desired, covers or shields for such indicator plates on front plates of electrical switches, which means should be capable of being assembled with the utmost simplicity and consist of simple elements, preclude an undesired detachment and be fully satisfactory in appearance.

In accordance with an important feature of the invention I provide a front plate with a central aperture surrounded by several additional apertures, this plate serving as a support for one or more plate-shaped members which in a preferred embodiment include an indicator plate and a transparent shield overlying the latter; a retaining member, provided with a cutout aligned with the central aperture of the front plate, positively engages the outermost one of the supported members (such as the shield) by being received in a central opening of such member and partially overlying same. The retaining member, in turn, overlies a region of the front plate which is occupied by the several apertures thereof and is provided with preferably resilient, hook-shaped tongues which project rearwardly through the aforementioned additional apertures of that plate and releasably engage its rear surface. Advantageously, in accordance with another feature of the invention, the front plate is provided with angularly spaced recesses which communicate with the apertures traversed by these tongues whereby the latter may be bent outwardly, with the aid of a suitable tool, to be disengaged from the front plate.

The accompanying drawing illustrates by way of example some embodiments of the invention and serves for the explanation of additional important features of the invention. Fig. 1 is a cross-sectional view showing a front plate with cover means, inserted in a wall. Fig. 2 is a cross-sectional view taken on line II—II of Fig. 3 and showing a retaining member. Fig. 3 is a bottom view. Figs. 4 and 5, respectively, are a bottom view and a sectional view showing another form of retaining member, Fig. 5 being a sectional view taken on line V—V of Fig. 4.

In Fig. 1, element 1 may be considered a metal wall, e.g., the wall of a switch box of a machine tool, in which the switch 2 is mounted by means of its front plate 3. The switch 2 may be affixed to the bayonet-joint-like retaining projections 4 of the front plate 3, as is described in Austrian Patent No. 194,470. The front plate 3 is affixed by screws 5 to the wall 1. The aperture 6 in the wall 1 is of circular shape and the plate 3 is square. The switch shaft 26 protrudes forwardly and carries the usual switch-operating knob (not shown) in known manner.

The problem resides in the connection of an indicator plate 7 and of a transparent cover plate or shield 8 overlying the sign plate to the front plate 3. To this end an annular retaining member 9 is provided which cooperates with an internal flange 10 of the cover plate 8 and has retaining tongues 11, these tongues extending through apertures 12 of the front plate 3 and engaging the rear surface 13 of the front plate 3 whereby the cover plate 8 and with it also the indicator plate 7 is clamped between the retaining member 9 and the front plate 3. The operating shaft 26 of the switch 2 extends through the central aperture of plate 3 and through an aligned cutout in the annular part 9. Provided that the retaining tongues 11 are radially resilient and have wedge-shaped end faces 14, according to another feature of the invention, and the ring 9 is appropriately shaped, this ring will automatically assume the correct position when applied from the outside to the cover plate 8 and will be held in this position by the tongues 11 snapping behind the edges of rear surface 13 so that an undesired detachment is precluded. This result will safely be achieved if two or advantageously three retaining tongues are provided.

The following measures are taken to enable the removal of the retaining ring thus located:

The retaining ring 9 with its tongues 11 consists of elastically deformable material, suitably of a synthetic thermoplastic such as a polyamide, so that it can be manufactured at low cost by injection molding. In those areas in which the front plate 3 holds the retaining tongues the front plate 3 has recesses 16 for introducing a screw driver or the like. These recesses are open toward the retaining tongues to enable the same to be bent out of the retaining position to a release position. If the retaining member is dimensioned to be slightly stressed in the direction of the switch shaft 26 in its locked position, as by being provided with resilient edge portions in the manner described hereinafter with reference to Figs. 2 and 3, the use of the screw driver will enable the removal of one tongue after the other out of its locking position so that the ring 9 can be pulled off. This great ease of disassembly is an appreciable advantage if it is necessary to remove the indicator plate 7, e.g., because the electric circuit has been changed and a plate having different inscriptions is required.

Figs. 2 and 3 show an annular retaining member 9a having three retaining tongues 11a distributed around its periphery. This annular retaining member has a sharp edge 17 engaging the front plate; this edge is so thin as to be elastically deformable. Generally, it is essential that those portions with which the retaining member overlies the indicator plate and the front plate be capable of yielding elastically in the direction of the switch shaft in order to ensure a chatterfree mounting of the device. It is understood that this idea can be realized in different forms. In this connection reference is made to the very thin and, therefore, resilient marginal portions 18 of the ring 9a in Fig. 2 and the recesses 19 in Fig. 3.

It is apparent from Figs. 4 and 5 that the present fixing means need not have the form of a ring. According to Figs. 4, 5 the device comprises a U-shaped retaining member 20 which carries on its underside two resilient tongues 21. The function is not changed; only the outline of the flange 10 of Fig. 1 must be adapted to this special form of the retaining member. This example indicates that numerous forms are possible for the present fixing means.

In the illustrative embodiments discussed hereinbefore the fixing means with which the device is anchored on the front plate consists of tongues which are capable of yielding resiliently in the radial direction. In some cases, however, it may be desirable in conjunction with an annular retaining member to move the retaining tongues by a rotation of the retaining member behind the retaining edges of the front plate and to hold them there as by a bayonet joint in known manner. This represents a form of assembly which has been discussed more fully in the above-mentioned Austrian Patent No. 194,470, which is expressly referred to herewith with respect to such structural details, subject, of course, to necessary modifications.

It may be mentioned that the retaining tongues may number more than three and may be outwardly inclined rather than inwardly as shown, or that the indicator plate may itself be composed of different backings and inserts, without departing from the spirit and scope of the invention.

What is claimed is:

1. A switch-mounting assembly comprising a front plate having a central aperture and a plurality of additional apertures spaced around said central aperture, cover means overlying the forward side of said front plate, said cover means being provided with a central opening overlying a region of said front plate occupied by said central aperture and by said additional apertures, and a retaining member in contact with and partially overlying said cover means at the periphery of said opening, said retaining member having a cutout aligned with said central aperture and being further provided with a plurality of hook-shaped tongues projecting rearwardly through said additional apertures, said tongues releasably locking said cover means to said front plate by engaging the rear surface of said front plate adjacent said additional apertures while being retractable through said additional apertures upon disengagement from said rear surface.

2. An assembly according to claim 1 wherein said tongues are resilient and adapted to be bent radially outwardly for disengagement from said rear surface.

3. An assembly according to claim 2 wherein said front plate is provided at its forward side with a plurality of angularly spaced recesses respectively communicating with said additional apertures, said recesses extending inwardly beyond the periphery of said cutout and enabling the insertion of a tool for the outward displacement of said tongues within said additional apertures.

4. An assembly according to claim 1 wherein said cover means comprises an indicator plate adjacent said front plate and a transparent shield member lying in front of said indicator plate, said retaining member being in contact with said shield member.

5. An assembly according to claim 1 wherein said retaining member is provided with resilient edge portions bearing upon said cover means in a manner urging the extremities of said tongues into firm contact with said rear surface.

References Cited in the file of this patent

UNITED STATES PATENTS

| | | |
|---|---|---|
| 1,797,635 | Buchsbaum | Mar. 24, 1931 |
| 2,802,082 | Kalwo | Aug. 6, 1957 |